Oct. 30, 1945.  H. P. PHILLIPS  2,387,855

PISTON RING

Filed March 16, 1944

INVENTOR.
HAROLD P. PHILLIPS
BY
Earl T. Chappell

Patented Oct. 30, 1945

2,387,855

UNITED STATES PATENT OFFICE 2,387,855

PISTON RING

Harold P. Phillips, Hastings, Mich., assignor to Hastings Manufacturing Company, Hastings, Mich., a corporation of Michigan Application March 16, 1944, Serial No. 526,716

5 Claims. (Cl. 309—44)

The main objects of this invention are:

First, to provide a piston ring which is well adapted for use as a compression ring in internal combustion engines.

Second, to provide a piston ring of the type having a cant or twist in which the cant or twist is very substantial while the ring is provided with a full width peripheral surface.

Third, to provide a piston ring of this character having an effective scraper and sealing action, at the same time is relatively strong and is not likely to be broken in installing.

Objects relating to details and economies of the invention will appear from the description to follow. The invention is defined in the claims.

Preferred embodiments of the invention are illustrated in the accompanying drawing, in which.

In the accompanying drawing, I represents a piston and 2 a ring groove therein. 3 represents a cylinder. No attempt is made in the accompanying drawing to illustrate the parts in their respective proportions or fitting tolerances.

The piston ring 4 is of the split expansible type and is desirably and commonly formed of cast iron. The top and bottom sides 5 and 6 of the ring are parallel and the ring is of uniform axial width. This results in the preferred form of a ring of rectangular radial section. The ring has an annular groove or channel 7 cut in one side thereof and within the inner half of the radial width of the ring, the groove being in its entirety in the side surface of the ring with the inner edge of the groove adjacent to but substantially spaced from the inner edge of the ring to provide an annular land of substantial width.

Figure 1:
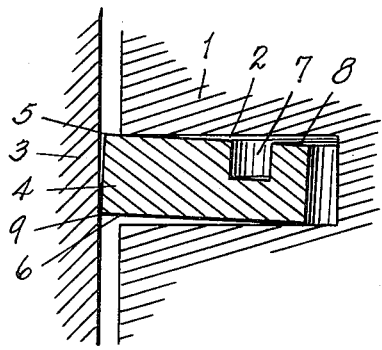
Fig. 1 is a fragmentary sectional view illustrating my improved piston ring as installed in a piston in operative relation to a cylinder, no attempt being made to show the parts in relative proportion.
Figure 2:
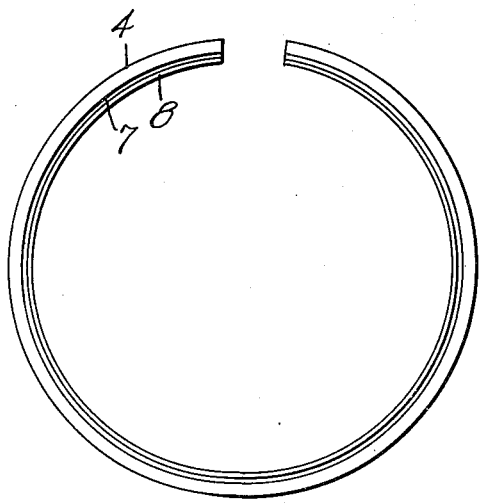
Fig. 2 is a top plan view of the ring of Fig. 1.

The forming of this groove in the side of the ring results in a counterbalancing of the inherent stresses of the ring so that the ring assumes a canted or twisted position and this is increased somewhat when the ring is compressed within the piston ring groove within a cylinder, as shown in Fig. 1. This not only presents a scraping and sealing edge 9 to the cylinder wall but serves to set up substantial frictional engagement of the ring with the upper and lower walls of the groove so that it is held against free rotation within the groove. However, it will be understood that suitable clearances are provided so that the ring has the desired free expansion action within the groove. The land 8 is of such width that it is not easily chipped or broken in the installing of the ring.

In the embodiment shown in Fig. 1, the groove is shown with substantially parallel sides. It will be understood that normally there is some curve or bevel at the edges of the groove and in the corners of the groove as it is difficult and not important to maintain the tool so as to provide a perfect shaped angle at these points and indeed that is not even especially desirable.

Figure 3:
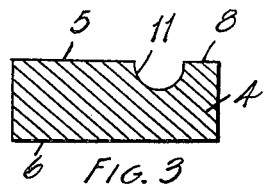
Figs. 3, 4, 5, 6 and 7 are fragmentary perspective views of modified forms or embodiments of my invention, the modifications being in the cross sectional shape of the groove.

In the embodiment shown in Fig. 3, the groove 11 is of the semi-circular or rounded section.

Figure 4:
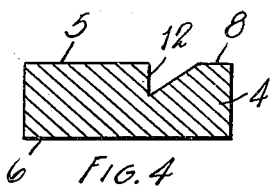
Figure 5:
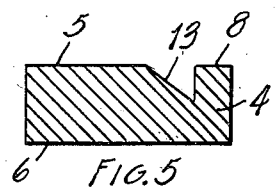
Figure 6:
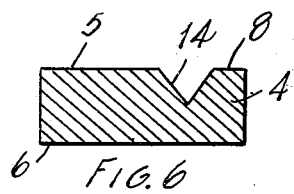
Figure 7:
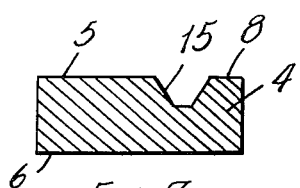

In Fig. 4, the groove 12 is of V-shape, the outer wall of the groove being substantially axial. In Fig. 5 it is the inner wall of the groove that is substantially axial. In Fig. 6, both walls of the groove are inclined. In Fig. 7, the groove has a flat bottom with inclined side walls.

It will be noted that in all of these embodiments the inner edge of the groove is substantially spaced from the inner edge of the ring thereby providing a land 8 of substantial width and also it will be noted that this land is in the same plane as the remainder of the side of the ring; at the same time the groove lies at the inner side of the radial center of the ring. The size and depth of the groove may be considerably varied to control the degree of cant or distortion. By positioning the groove completely in the side of the ring, relatively thin rings—that is, rings axially thin, may be produced with the desired cant or distortion, at the same time the ring is not objectionably weakened.

The grooves are formed after the ring has been shaped—that is, if it is formed as a casting the groove is formed in the ring after casting. If the ring is fabricated from ribbon steel the groove is formed after coiling the stock. This results in rendering inherent stresses unstable with the resulting canting or twisting of the ring.

Rings embodying my invention are highly practical in thin deep walled rings as distinguished from relatively thick rings. By arranging the groove as I have described in the side of the ring adjacent to but spaced from the edge of the ring so as to provide a land of substantial width between the groove and the inner edge of the ring, a side wear surface is maintained of substantially the full width of the ring and the land is not easily broken or fractured in installing the ring. Should carbon collect in the groove in the applicant's ring no objectionable results follow as is the case where the rings are provided with grooves that open to the outer peripheral face of the ring. The groove is desirably spaced away from the inner bore of the ring approximately .020 and it is desirably about .025 deep and about .025 wide although it will be understood that this varies somewhat with the amount of canting or twisting which it is desired to produce.

Where the rings are intended to be installed in the top of compression ring grooves of a piston, the groove is formed on the under side of the ring so that the cant of the ring is downward instead of upward. This provides a more effective blow-by sealing.

In the manufacture of rings embodying my invention, the clearances as compared to other rings should be taken into consideration—that is, the manufacturing clearance in the ring before grooving should exceed somewhat that of the standard type of ring in order to compensate for the canting and permit the desired canting in the ring groove. For example, the common type of ring designed for a groove .09375 in width is .09275 to .09225 to secure the desired clearance. The width of the ring of my invention may desirably be .09175 to .09125 to provide additional groove clearance.

As stated, rings embodying my invention may be installed without danger of breaking—that is, their liability to breakage is not greatly increased by the groove at the side of the ring. The wear on the wall and piston ring groove is substantially the same as in the common type of compression or scraper rings not having the cant or twist.

As stated, I have not attempted to illustrate an embodiment of my invention in proportion or in clearances as this is not practical and the varying sizes of the rings and clearances are well understood by those skilled in the art.

Having thus described my invention, what I claim as new and desire to secure by Letters Patent, is:

1. A cast iron split expansible resilient piston ring having parallel sides and outer and inner peripheral surfaces of the full axial width of the ring, there being a channel-like groove in the upper face of the ring disposed substantially entirely within the inner half of the radial width of the ring and adjacent to but substantially spaced from the inner peripheral edge of the ring whereby the ring assumes and retains a permanent upward cant when compressed in a piston ring groove and whereby a side wearing surface of substantial width is provided between the groove and the inner edge of the ring.

2. A split expansible resilient compression piston ring having parallel sides of substantially uniform radial width throughout, one side of the ring having an annular groove disposed substantially entirely within the inner half of the radial width of the ring, the inner edge of the groove being disposed adjacent to but spaced from the inner edge of the ring, there being an annular land of substantial width between the inner edge of the groove and the inner edge of the ring, such land being in the plane of the remaining surface of the ring at the outer side of the groove to constitute a wearing surface for the ring, the groove resulting in a permanent cant to the ring when it is compressed within a piston ring groove.

3. A split expansible piston ring of substantially rectangular section having a continuous annular groove in one side thereof, the inner edge of the groove being adjacent but spaced from the inner edge of the ring, there being a continuous land of uniform and substantial width between the inner edge of the groove and the inner edge of the ring, said land constituting a wearing surface for the ring, the ring assuming and retaining a permanent cant when it is compressed in a piston ring groove.

4. A split expansible piston ring having parallel sides of uniform radial width, one side of the ring having an annular groove disposed entirely within the side of the ring and adjacent to but spaced from the inner edge of the ring by an annular land of a width approximating the order of .020, such land being in the plane of the remaining surface of the ring at the outer side of the groove, said land constituting a wearing surface for the ring, the groove resulting in the permanent canting or twisting of the ring when it is compressed into a piston ring groove.

5. A split expansible piston ring having parallel sides, one side of the ring having an annular groove disposed adjacent to but spaced from one of the edges of the ring by an annular land of substantial width, such land providing a wearing surface for the ring, said groove being disposed substantially entirely within one of the halves of the radial width of the ring, the groove resulting in the permanent canting or twisting of the ring when it is compressed into a piston ring groove.

HAROLD P. PHILLIPS.